(12) United States Patent
Jang

(10) Patent No.: US 10,919,411 B2
(45) Date of Patent: Feb. 16, 2021

(54) METHOD AND APPARATUS FOR CHARGING LOW VOLTAGE BATTERY OF MILD HYBRID ELECTRIC VEHICLE

(71) Applicants: HYUNDAI MOTOR COMPANY, Seoul (KR); KIA MOTORS CORPORATION, Seoul (KR)

(72) Inventor: Hwa Yong Jang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 575 days.

(21) Appl. No.: 15/806,833

(22) Filed: Nov. 8, 2017

(65) Prior Publication Data

US 2018/0134174 A1 May 17, 2018

(30) Foreign Application Priority Data

Nov. 11, 2016 (KR) .................. 10-2016-0149963

(51) Int. Cl.
*B60L 58/13* (2019.01)
*B60L 11/18* (2006.01)
*B60L 50/15* (2019.01)

(52) U.S. Cl.
CPC .......... *B60L 58/13* (2019.02); *B60L 11/1862* (2013.01); *B60L 50/15* (2019.02); *B60L 2210/10* (2013.01);
(Continued)

(58) Field of Classification Search
CPC ...... B60L 11/1862; B60L 58/13; B60L 50/15; B60L 2240/12; B60L 2210/10; B60L 2250/26; B60L 2240/54; B60L 2240/441; B60L 58/10; B60L 53/20; B60L 58/12; B60L 2240/547; Y02T 10/7044;
(Continued)

(56) References Cited

U.S. PATENT DOCUMENTS

2014/0074331 A1* 3/2014 Shin .................. B60L 50/61
701/22
2017/0151876 A1* 6/2017 Kinoshita ............ B60L 58/13
(Continued)

FOREIGN PATENT DOCUMENTS

KR 10-2009-0062339 A 6/2009
KR 10-1160755 B1 6/2012
(Continued)

*Primary Examiner* — Drew A Dunn
*Assistant Examiner* — Sailesh Thapa
(74) *Attorney, Agent, or Firm* — Brinks Gilson & Lione

(57) ABSTRACT

The present disclosure provides a method and an apparatus for charging a low voltage battery of a mild hybrid electric vehicle. The method of charging a low voltage battery may includes: detecting data for charging a low voltage battery; determining whether a predetermined travelling condition is satisfied based on the data; comparing a current state of charge (SOC) of a high voltage battery with a first reference SOC when the predetermined travelling condition is satisfied; comparing a current SOC of the low voltage battery with a second reference SOC when the current SOC of the high voltage battery is equal to or greater than the first reference SOC; determining a target SOC based on the current SOC of the low voltage battery; and determining a charging speed and a charging amount of the low voltage battery.

14 Claims, 3 Drawing Sheets

(52) U.S. Cl.
CPC ..... *B60L 2240/12* (2013.01); *B60L 2240/441* (2013.01); *B60L 2240/54* (2013.01); *B60L 2250/26* (2013.01); *B60Y 2200/92* (2013.01); *Y02T 10/70* (2013.01)

(58) Field of Classification Search
CPC ............... Y02T 10/7005; B60R 16/02; B60Y 2400/303; B60Y 2200/92; B60W 2540/12; B60W 2540/10; B60W 10/26; B60W 20/00; B60W 30/18009
See application file for complete search history.

(56) References Cited

U.S. PATENT DOCUMENTS

| | | | |
|---|---|---|---|
| 2017/0240162 A1* | 8/2017 | Higashitani | B60W 20/13 |
| 2018/0093656 A1* | 4/2018 | Yamazaki | B60W 10/08 |

FOREIGN PATENT DOCUMENTS

| | | |
|---|---|---|
| KR | 10-2013-0011073 A | 1/2013 |
| KR | 10-1371476 B1 | 3/2014 |
| KR | 10-2014-0142559 A1 | 12/2014 |
| KR | 10-1500080 B1 | 3/2015 |
| KR | 10-1583996 B1 | 1/2016 |
| KR | 10-2016-0073434 A | 6/2016 |

* cited by examiner

METHOD AND APPARATUS FOR CHARGING LOW VOLTAGE BATTERY OF MILD HYBRID ELECTRIC VEHICLE

CROSS-REFERENCE TO RELATED APPLICATION

This application claims priority to and the benefit of Korean Patent Application No. 10-2016-0149963, filed on Nov. 11, 2016, which is incorporated herein by reference in its entirety.

FIELD

The present disclosure relates to a method and an apparatus for charging a low voltage battery of a mild hybrid electric vehicle.

BACKGROUND

The statements in this section merely provide background information related to the present disclosure and may not constitute prior art.

As is well known, a hybrid electric vehicle uses an internal combustion engine and a battery power together. In other words, the hybrid electric vehicle efficiently combines and uses power of the internal combustion engine and power of a motor.

The hybrid electric vehicle may be categorized as either a mild type or a hard type according to a share ratio of the power of the engine and the motor. In the case of the mild type of hybrid electric vehicle (hereinafter, referred to as a mild hybrid electric vehicle), a mild hybrid starter & generator (MHSG) configured to start the engine or generate electricity by an output of the engine is used instead of an alternator. In the case of the hard type of hybrid electric vehicle, a driving motor for generating driving torque is used in addition to an integrated starter & generator (ISG) configured to start an engine and generate electricity.

The mild hybrid electric vehicle does not have a driving mode, in which the vehicle is driven only by torque from the MHSG, but instead the MHSG may assist in torque of the engine according to a travelling state, and charge a high voltage battery (for example, a 48 V battery) during regenerative braking. Accordingly, it is possible to improve fuel efficiency of the mild hybrid electric vehicle.

The mild hybrid electric vehicle drives the MHSG by using a voltage of the high voltage battery, and drives an electric load by using a voltage of the low voltage battery (for example, a 12 V battery). The electric load includes an electric electronic device, such as a head lamp, a blower, and a wiper, using the voltage of the low voltage battery. A low voltage DC-DC converter, which converts a high voltage supplied from the high voltage battery into a low voltage and supplies the converted low voltage to an electric load using a low voltage as an operation voltage, is disposed between the high voltage battery and the low voltage battery.

Since the low voltage battery is charged by using power of the high voltage battery, we have discovered that in the mild hybrid electric vehicle, the charging or the discharging of the high voltage battery is desired to be determined according to a driving state of the MHSG so as to efficiently charge the low voltage battery.

The above information disclosed in this Background section is only for enhancement of understanding of the background of the present disclosure and therefore it may contain information that does not form the prior art that is already known to a person of ordinary skill in the art.

SUMMARY

The present disclosure provides a method and an apparatus for charging a low voltage battery of a mild hybrid electric vehicle, which are capable of efficiently charging a low voltage battery in consideration of a travelling condition and a state of the MHSG of the mild hybrid electric vehicle.

An exemplary form of the present disclosure provides a method of charging a low voltage battery of a mild hybrid electric vehicle, the method including: detecting, by a controller, data for charging a low voltage battery; determining, by the controller, whether a predetermined travelling condition is satisfied based on the detected data; determining, by the controller, whether a current state of charge (SOC) of a high voltage battery is equal to or greater than a first reference SOC when the predetermined travelling condition is satisfied; determining, by the controller, whether a current SOC of the low voltage battery is equal to or less than a second reference SOC when the current SOC of the high voltage battery is equal to or greater than the first reference SOC; determining, by the controller, a target SOC based on the current SOC of the low voltage battery when the current SOC of the low voltage battery is equal to or less than the second reference SOC; and determining, by the controller, a charging speed and a charging amount of the low voltage battery based on the target SOC, a state of a mild starter & generator (MHSG), and consumption power of an electric load.

The detecting of the data for charging the low voltage battery may include detecting a position value of an accelerator pedal by an accelerator pedal position detector, a position value of a brake pedal by a brake pedal position detector, a speed of the mild hybrid electric vehicle by a vehicle speed detector, a speed of an engine by an engine speed detector, an SOC of the high voltage battery by a first SOC detector, an SOC of the low voltage battery by a second SOC detector, and consumption power of the electric load by a consumption power detector.

The predetermined travelling condition may be satisfied when an engine is in an idle state, the mild hybrid electric vehicle is in a high-speed travelling state or a cruise travelling state, or the mild hybrid electric vehicle is in a coast travelling state.

In one form, the determining of the charging speed and the charging amount of the low voltage battery may include, when the MHSG does not assist torque of an engine and the consumption power of the electric load is equal to or greater than a first power, charging the low voltage battery so that the current SOC of the low voltage battery reaches the target SOC with a first charging speed.

In another form, the determining of the charging speed and the charging amount of the low voltage battery may include, when the MHSG assists in torque of an engine and the consumption power of the electric load is equal to or greater than a first power, stopping of the assisting in torque of the engine by the MHSG, and charging the low voltage battery so that the current SOC of the low voltage battery reaches the target SOC with a first charging speed.

In another form, the determining of the charging speed and the charging amount of the low voltage battery may include, when the MHSG assists in torque of an engine and the consumption power of the electric load is equal to or greater than a second power, charging the low voltage battery so that the current SOC of the low voltage battery reaches an intermediate SOC with a first charging speed. In particular, the intermediate SOC may be a value between the current SOC of the low voltage battery and the target SOC.

In still another form, the determining of the charging speed and the charging amount of the low voltage battery may further include charging the low voltage battery so that the current SOC of the low voltage battery reaches the target SOC from the intermediate SOC with a second charging speed, and the second charging speed may be less than the first charging speed.

Another exemplary form of the present disclosure provides an apparatus for charging a low voltage battery of a mild hybrid electric vehicle. The apparatus may include: a mild hybrid starter & generator (MHSG) configured to start an engine or generate electricity with an output of the engine; a low voltage DC-DC converter configured to convert a voltage supplied from a high voltage battery into a low voltage and configured to charge a low voltage battery; a data detector configured to detect data for charging the low voltage battery; and a controller configured to determine whether a predetermined travelling condition is satisfied based on the detected data.

In particular, the controller is configured to: determine whether a current state of charge (SOC) of the high voltage battery is equal to or greater than a first reference SOC when the predetermined travelling condition is satisfied, determine whether a current SOC of the low voltage battery is equal to or less than a second reference SOC when the current SOC of the high voltage battery is equal to or greater than the first reference SOC, determine a target SOC based on the current SOC of the low voltage battery when the current SOC of the low voltage battery is equal to or less than the second reference SOC, and determine a charging speed and a charging amount of the low voltage battery based on the target SOC, a state of the MHSG, consumption power of an electric load.

The data detector may include: an accelerator pedal position detector configured to detect a position value of an accelerator pedal; a brake pedal position detector configured to detect a position value of a brake pedal; a vehicle speed detector configured to detect a speed of the mild hybrid electric vehicle; an engine speed detector configured to detect a speed of the engine; a first SOC detector configured to detect an SOC of the high voltage battery; a second SOC detector configured to detect an SOC of the low voltage battery; and power consumption detector configured to detect consumption power of the electric load.

The predetermined travelling condition may be satisfied when an engine is in an idle state, the mild hybrid electric vehicle is in a high-speed travelling state or a cruise travelling state, or the mild hybrid electric vehicle is in a coast travelling state.

When the MHSG does not assist in torque of the engine and the consumption power of the electric load is equal to or greater than a first power, the controller may charge the low voltage battery so that the current SOC of the low voltage battery reaches the target SOC with a first charging speed.

When the MHSG assists in torque of the engine and the consumption power of the electric load is equal to or greater than a first power, the controller may stop assisting in torque of the engine, and charge the low voltage battery so that the current SOC of the low voltage battery reaches the target SOC with a first charging speed.

When the MHSG assists in torque of the engine and consumption power of the electric load is equal to or greater than a second power, the controller may charge the low voltage battery so that the current SOC of the low voltage battery reaches an intermediate SOC with a first charging speed, and the intermediate SOC may be a value between the current SOC of the low voltage battery and the target SOC.

The controller may charge the low voltage battery so that the current SOC of the low voltage battery reaches the target SOC from the intermediate SOC with a second charging speed, and the second charging speed may be less than the first charging speed.

As described above, according to the exemplary form of the present disclosure, the low voltage battery is charged in consideration of a travelling condition of the mild hybrid electric vehicle, a state of the MHSG, an SOC of the high voltage battery, an SOC of the low voltage battery, and consumption power of an electric load, thereby improving charging efficiency of the low voltage battery.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
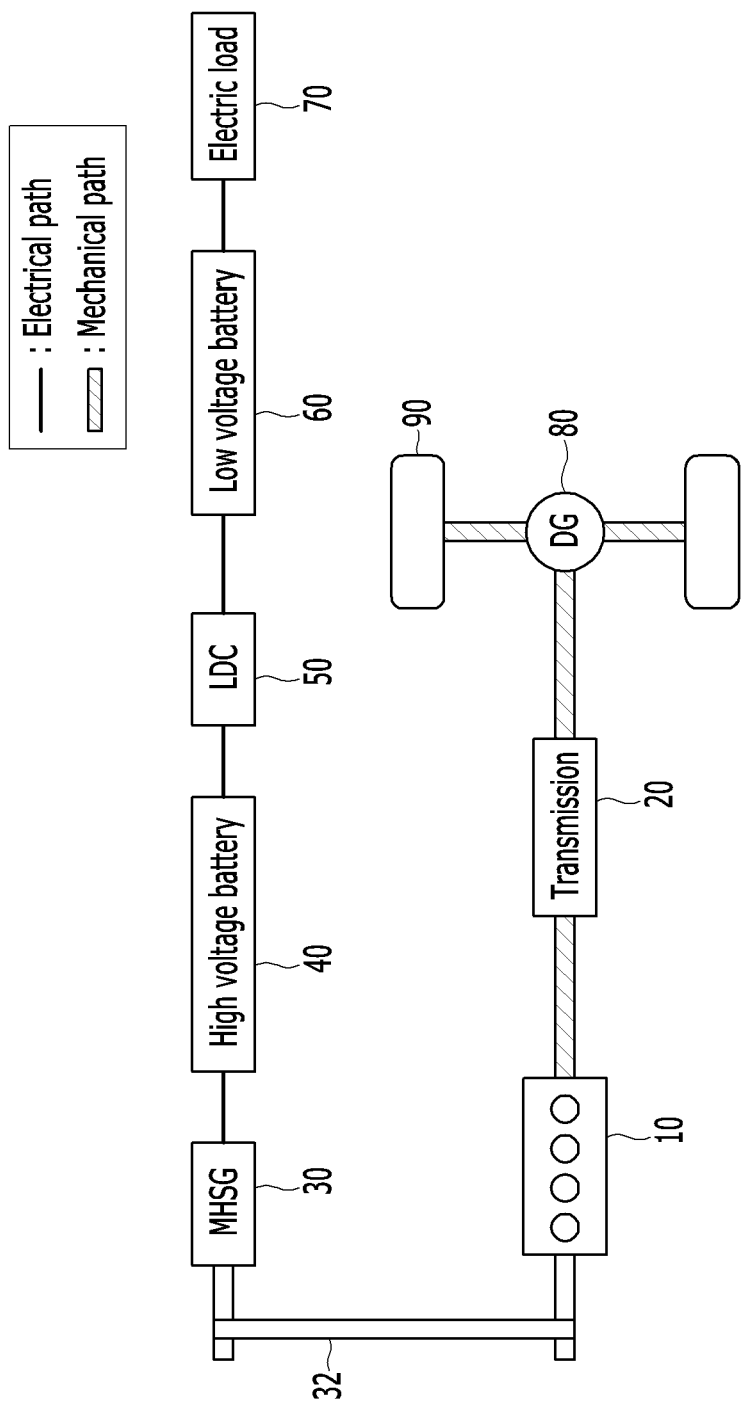
FIG. 1 is a block diagram illustrating a mild hybrid electric vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure. Accordingly, the drawings and description are to be regarded as illustrative in nature and not restrictive.

In addition, each configuration illustrated in the drawings is arbitrarily shown for convenience of a description, but the present disclosure is not limited thereto.

FIG. 1 is a block diagram illustrating a mild hybrid electric vehicle according to an exemplary form of the present disclosure.

As illustrated in FIG. 1, a mild hybrid electric vehicle includes: an engine 10, a transmission 20, a mild hybrid starter & generator (MHSG) 30, a high voltage battery 40, a low voltage DC-DC converter (LDC) 50, a low voltage battery 60, an electric load 70, a differential gear apparatus 80, and wheels 90.

The engine 10 combusts fuel and generates torque, and various engines, such as a gasoline engine, a diesel engine, and a liquefied petroleum injection (LPI) engine, may be used.

In the mild hybrid electric vehicle, the torque of the engine 10 is transmitted to an input shaft of the transmission 20, and torque output from the output shaft of the transmission 20 is transmitted to an axle via the differential gear apparatus 80. The axle rotates the wheels 90, so that the mild hybrid electric vehicle runs by the torque of the engine 10.

The MHSG 30 converts electric energy into mechanical energy, or converts mechanical energy into electric energy. Here, the MHSG 30 may start the engine 10 or generate electricity by an output of the engine 10. Further, the MHSG 30 may assist in the torque of the engine 10. The mild hybrid electric vehicle may use combustion torque of the engine 10 as main torque, and use the torque of the MHSG 30 as auxiliary torque. The engine 10 and the MHSG 30 may be connected through a belt 32.

The high voltage battery 40 may supply power to the MHSG 30, or may be charged by power collected through the MHSG 30. The high voltage battery 40 may be a battery of 48 V.

The LDC 50 converts a voltage supplied from the high voltage battery 40 into a low voltage (for example, 12 V), and charges the low voltage battery 60.

The low voltage battery 60 may be charged with power supplied from the LDC 50. The low voltage battery 60 may be a battery of 12 V, and supplies a low voltage to the electric load 70.

The electric load 70 includes various electric electronic devices, such as a head lamp, an air conditioner, and a wiper, using the power of the low voltage battery 60.

Figure 2:
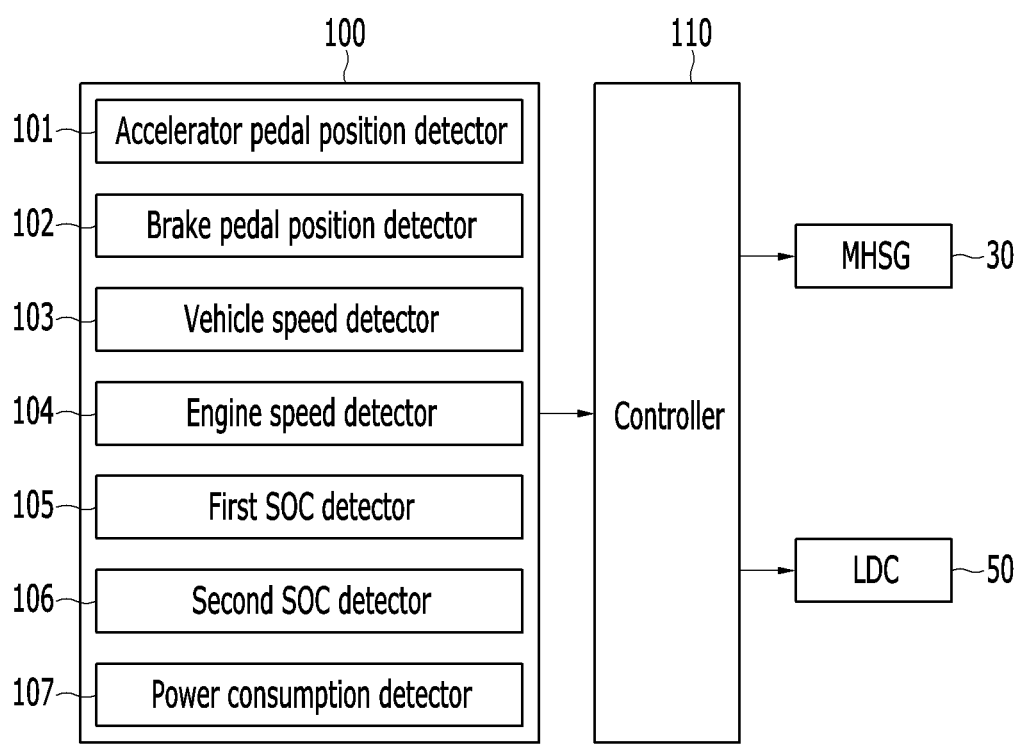
FIG. 2 is a block diagram illustrating a low voltage battery charging apparatus of a mild hybrid electric vehicle.

FIG. 2 is a block diagram illustrating a low voltage battery charging apparatus of a mild hybrid electric vehicle according to an exemplary form of the present disclosure.

As illustrated in FIG. 2, a low voltage battery charging apparatus of a mild hybrid electric vehicle includes a data detector 100, a controller 110, the MHSG 30, and the LDC 50.

The data detector 100 detects data for charging a low voltage battery, and the data detected by the data detector 100 is transmitted to the controller 110. The data detector 100 may include an accelerator pedal position detector 101, a brake pedal position detector 102, a vehicle speed detector 103, an engine speed detector 104, a first SOC detector 105, a second SOC detector 106, and a consumption power detector 107.

The accelerator pedal position detector 101 detects a position value of an accelerator pedal (i.e., a pushed degree of the accelerator pedal), and transmits a signal for the detected position value to the controller 110. When the accelerator pedal is completely pushed, the position value of the accelerator pedal is 100%, and when the accelerator pedal is not pushed, the position value of the accelerator pedal is 0%.

The brake pedal position detector 102 detects a position value of a brake pedal (i.e., a pushed degree of the brake pedal), and transmits a signal for the detected position value to the controller 110. When the brake pedal is completely pushed, the position value of the brake pedal is 100%, and when the brake pedal is not pushed, the position value of the brake pedal is 0%.

The vehicle speed detector 103 detects a speed of the mild hybrid electric vehicle, and transmits a signal for the detected speed to the controller 110.

The engine speed detector 104 detects a speed of the engine 10, and transmits a signal for the detected speed to the controller 110. The engine speed detector 104 may detect a speed of the engine based on a phase change of a crankshaft.

The first SOC detector 105 detects a state of charge (SOC) of the high voltage battery 40, and transmits a signal for the detected SOC to the controller 110. The first SOC detector 105 may measure a current and a voltage of the high voltage battery 40 and predict an SOC of the high voltage battery 40 based on the measured current and voltage, instead of directly detecting the SOC of the high voltage battery 40.

The second SOC detector 106 detects an SOC of the low voltage battery 60, and transmits a signal for the detected SOC to the controller 110.

The consumption power detector 107 detects consumption power consumed in the electric load 70 using a low voltage of the low voltage battery 60, and transmits a signal for the detected consumption power to the controller 110. The consumption power detector 107 may detect consumption power consumed in the electric load 70 based on an input voltage and an input current of the electric load 70.

The controller 110 may control the operations of the MHSG 30 and the LDC 50 based on the data detected by the data detector 100. The controller 110 may charge the low voltage battery 60 by using power of the high voltage battery 40 by operating the LDC 50. To this end, the controller 110 may be implemented by one or more processors executed by a set program, and the set program may include a series of commands for performing each step of a low voltage battery charging control method of a mild hybrid electric vehicle in one exemplary form of the present disclosure to be described below.

Figure 3:
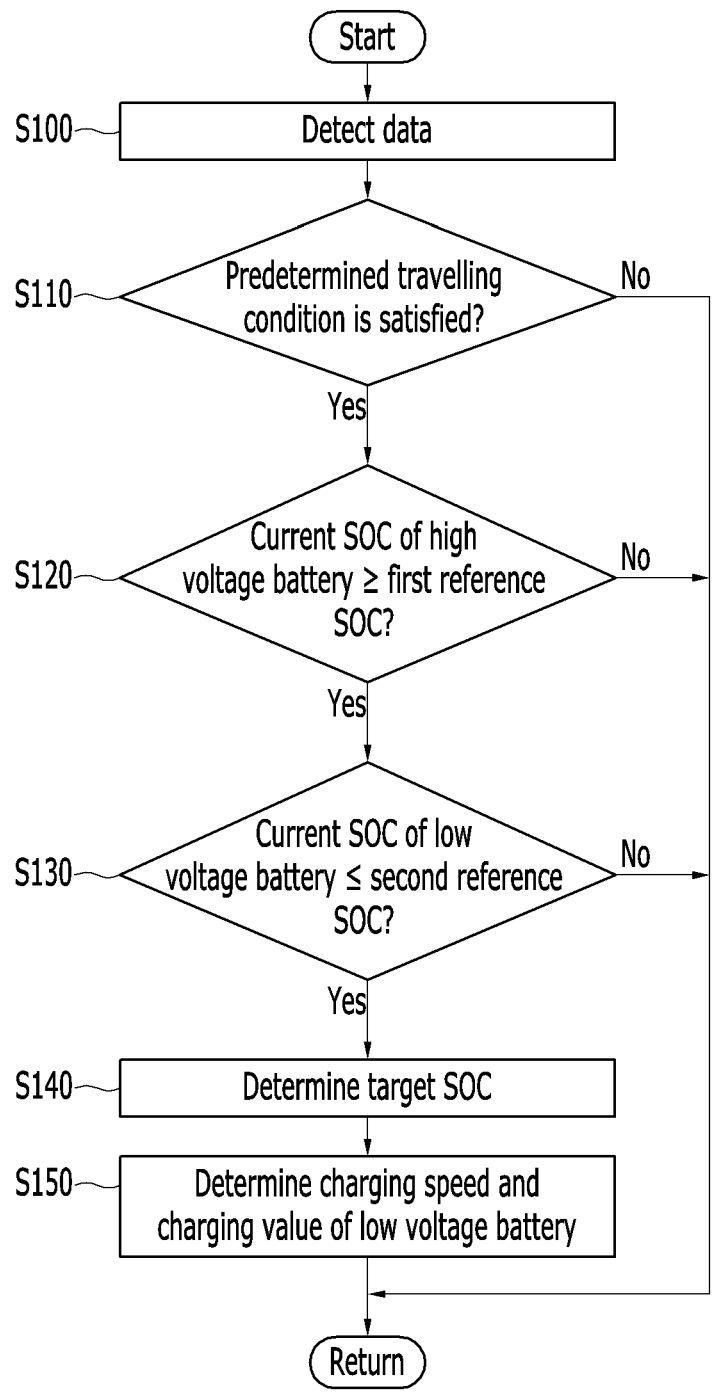
FIG. 3 is a flowchart illustrating a low voltage battery charging method of a mild hybrid electric vehicle.

FIG. 3 is a flowchart illustrating a low voltage battery charging method of the mild hybrid electric vehicle in one exemplary form of the present disclosure.

As illustrated in FIG. 3, the controller 110 detects data for charging the low voltage battery 60 at step S100. In other words, the accelerator pedal position detector 101 detects a position value of the accelerator pedal, the brake pedal position detector 102 detects a position value of the brake pedal, the vehicle speed detector 103 detects a speed of the mild hybrid electric vehicle, the engine speed detector 104 detects a speed of the engine 10, the first SOC detector 105 detects an SOC of the high voltage battery 40, the second SOC detector 106 detects an SOC of the low voltage battery 60, and the consumption power detector 107 detects consumption power consumed in the electric load 70.

The controller 110 determines whether a predetermined travelling condition is satisfied based on the data at step S110. The predetermined travelling condition may be satisfied when the engine 10 is in an idle state, the mild hybrid electric vehicle is in a high-speed travelling state or a cruise travelling state, or the mild hybrid electric vehicle is in a coast travelling state. The controller 110 may determine whether the predetermined travelling condition is satisfied based on the signals of the acceleration peal position detector 101, the brake pedal position detector 102, the vehicle speed detector 103, and the engine speed detector 104.

Under the predetermined travelling condition, the MHSG 30 generates electricity by using an output of the engine 10, so that the high voltage battery 40 may be charged. When the mild hybrid electric vehicle is in the high speed travelling state or the cruise travelling state, the MHSG 30 may assist in the torque of the engine 10. In the meantime, when the mild hybrid electric vehicle is in the low speed travelling state or a hill climbing travelling state, the MHSG 30 assists in the torque of the engine 10, so that power of the high voltage battery 40 is consumed.

When the predetermined travelling condition is not satisfied at step S110, the process of charging the low voltage battery 60 is terminated.

When the predetermined travelling condition is satisfied at step S110, the controller 110 determines whether a current SOC of the high voltage battery 40 is equal to or greater than a first reference SOC at step S120. The first reference SOC may be set with a value enough to supply the power of the high voltage battery 40 to the low voltage battery 60.

When the current SOC of the high voltage battery 40 is less than the first reference SOC at step S120, the process of charging the low voltage battery 60 is terminated. In this case, the SOC of the high voltage battery 40 is not sufficient, so that the high voltage battery 40 may not supply the power to the low voltage battery 60.

When the current SOC of the high voltage battery 40 is equal to or greater than the first reference SOC at step S120, the controller 110 determines whether the current SOC of the low voltage battery 60 is equal to or less than a second reference SOC at step S130. The second reference SOC may be set with a value for determining whether the low voltage battery 60 is in a charging desired state.

When the current SOC of the low voltage battery 60 is greater than the second reference SOC at step S130, the process of charging the low voltage battery 60 is terminated.

When the current SOC of the low voltage battery 60 is equal to or less than the second reference SOC at step S130, the controller 110 determines a target SOC based on the current SOC of the low voltage battery 60 at step S140. The low voltage battery 60 may be charged by using the power of the high voltage battery 40 so that the SOC of the low voltage battery 60 reaches the target SOC. The controller 110 may determine the target SOC by using a map, in which a target SOC according to the current SOC of the low voltage battery 60 is set.

The controller 110 may determine a charging speed and a charging amount of the low voltage battery 60 based on the target SOC, the state of the MHSG 30, and consumption power of the electric load 70 (S150).

When the MHSG 30 does not assist in the torque of the engine 10 and the consumption power of the electric load 70 is equal to or greater than a first power, the controller 110 may charge the low voltage battery 60 so that the current SOC of the low voltage battery 60 reaches the target SOC with a first charging speed. That is, when the consumption power of the electric load 70 is relatively low, and the MHSG 30 does not generate torque, so that it is appropriate to transmit the power of the high voltage battery 40 to the low voltage battery 60, the controller 110 may charge the low voltage battery 60 with a rapid speed until the current SOC of the low voltage battery 60 reaches the target SOC. The first power and the first charging speed may be set by a person of ordinary skill in the art in consideration of performance of the MHSG 30, the high voltage battery 40, and the low voltage battery 60.

When the MHSG 30 assists in the torque of the engine 10 and the consumed power of the electric load 70 is equal to or greater than the first power, the controller 110 may stop the torque assistance by the MHSG 30, and charge the low voltage battery 60 so that the current SOC of the low voltage battery 60 reaches the target SOC with the first charging speed. Here, the controller 110 may stop the generation of the torque of the MHSG 30 in order to transmit the power of the high voltage battery 40 to the low voltage battery 60.

When the MHSG 30 assists in the torque of the engine 10 and the consumed power of the electric load 70 is equal to or greater than a second power, the controller 110 may charge the low voltage battery 60 so that the current SOC of the low voltage battery 60 reaches an intermediate SOC with the first charging speed. Here, the second power is greater than the first power, and the intermediate SOC is a value between the current SOC of the low voltage battery 60 and the target SOC, and may be determined according to the consumption power of the electric load 70. That is, when the consumption power of the electric load 70 is relatively high and the MHSG 30 generates torque, the controller 110 may charge the low voltage battery 60 with a rapid speed until the current SOC of the low voltage battery 60 reaches the intermediate SOC. Then, the controller 110 may charge the low voltage battery 60 until the current SOC of the low voltage battery 60 reaches the target SOC from the intermediate SOC with a second charging speed. The second charging speed may be less than the first charging speed. That is, charging efficiency of the low voltage battery 60 may be improved by dividing a section from the current SOC to the target SOC of the low voltage battery 60. Here, a case where the section from the current SOC to the target SOC of the low voltage battery 60 is divided into two sections is exemplified, but the present disclosure is not limited thereto. The technical spirit of the present disclosure may be applied even to the case where the section from the current SOC to the target SOC of the low voltage battery 60 is divided into more sections and a plurality of intermediate SOCs is set.

As described above, the low voltage battery 60 is charged in consideration of a travelling condition of the mild hybrid electric vehicle, a state of the MHSG 30, an SOC of the high voltage battery 40, an SOC of the low voltage battery 60, and consumption power of the electric load 70, thereby improving charging efficiency of the low voltage battery 60.

While this present disclosure has been described in connection with what is presently considered to be practical example forms, it is to be understood that the present disclosure is not limited to the disclosed forms, but, on the contrary, is intended to cover various modifications and equivalent arrangements included within the spirit and scope of the present disclosure.

What is claimed is:

1. A method of charging a low voltage battery of a mild hybrid electric vehicle, the method comprising:
   detecting data, by a controller, for charging a low voltage battery;
   determining, by the controller, whether a predetermined travelling condition is satisfied based on the detected data;
   determining, by the controller, whether a current state of charge (SOC) of a high voltage battery is equal to or greater than a first reference SOC when the predetermined travelling condition is satisfied;
   determining, by the controller, whether a current SOC of the low voltage battery is equal to or less than a second reference SOC when the current SOC of the high voltage battery is equal to or greater than the first reference SOC;
   determining, by the controller, a target SOC based on the current SOC of the low voltage battery when the current SOC of the low voltage battery is equal to or less than the second reference SOC; and
   determining, by the controller, a charging speed and a charging amount of the low voltage battery based on the target SOC, a state of a mild starter and generator (MHSG), and consumption power of an electric load.

2. The method of claim 1, wherein the detecting of the data for charging the low voltage battery includes:
   detecting a position value of an accelerator pedal by an accelerator pedal position detector,
   detecting a position value of a brake pedal by a brake pedal position detector, detecting a speed of the mild hybrid electric vehicle by a vehicle speed detector,
detecting a speed of an engine by an engine speed detector,
detecting a SOC of the high voltage battery by a first SOC detector,
detecting a SOC of the low voltage battery by a second SOC detector, and
detecting consumption power of the electric load by a consumption power detector.

3. The method of claim 1, wherein the predetermined travelling condition is satisfied when an engine is in an idle state, the mild hybrid electric vehicle is in a high-speed travelling state or a cruise travelling state, or the mild hybrid electric vehicle is in a coast travelling state.

4. The method of claim 1, wherein the determining of the charging speed and the charging amount of the low voltage battery includes:
when the MHSG does not assist in torque of an engine and the consumption power of the electric load is equal to or greater than a first power, charging the low voltage battery so that the current SOC of the low voltage battery reaches the target SOC with a first charging speed.

5. The method of claim 1, wherein the determining of the charging speed and the charging amount of the low voltage battery includes:
when the MHSG assists in torque of an engine and the consumption power of the electric load is equal to or greater than a first power, stopping the assisting in torque of the engine by the MHSG, and charging the low voltage battery so that the current SOC of the low voltage battery reaches the target SOC with a first charging speed.

6. The method of claim 1, wherein the determining of the charging speed and the charging amount of the low voltage battery includes:
when the MHSG assists in torque of an engine and the consumption power of the electric load is equal to or greater than a second power, charging the low voltage battery so that the current SOC of the low voltage battery reaches an intermediate SOC with a first charging speed, and
wherein the intermediate SOC is a value between the current SOC of the low voltage battery and the target SOC.

7. The method of claim 6, wherein the determining of the charging speed and the charging amount of the low voltage battery further includes:
charging the low voltage battery so that the current SOC of the low voltage battery reaches the target SOC from the intermediate SOC with a second charging speed, and
wherein the second charging speed is less than the first charging speed.

8. An apparatus for charging a low voltage battery of a mild hybrid electric vehicle, the apparatus comprising:
a mild hybrid starter & generator (MHSG) configured to start an engine and generate electricity with an output of the engine;
a low voltage DC-DC converter configured to convert a voltage supplied from a high voltage battery into a low voltage and configured to charge a low voltage battery;
a data detector configured to detect data for charging the low voltage battery; and
a controller configured to determine whether a predetermined travelling condition is satisfied based on the detected data,
wherein the controller is configured to:
determine whether a current state of charge (SOC) of the high voltage battery is equal to or greater than a first reference SOC when the predetermined travelling condition is satisfied,
determine whether a current SOC of the low voltage battery is equal to or less than a second reference SOC when the current SOC of the high voltage battery is equal to or greater than the first reference SOC,
determine a target SOC based on the current SOC of the low voltage battery when the current SOC of the low voltage battery is equal to or less than the second reference SOC, and
determine a charging speed and a charging amount of the low voltage battery based on the target SOC, a state of the MHSG, consumption power of an electric load.

9. The apparatus of claim 8, wherein the data detector includes:
an accelerator pedal position detector configured to detect a position value of an accelerator pedal;
a brake pedal position detector configured to detect a position value of a brake pedal;
a vehicle speed detector configured to detect a speed of the mild hybrid electric vehicle;
an engine speed detector configured to detect a speed of the engine;
a first SOC detector configured to detect an SOC of the high voltage battery;
a second SOC detector configured to detect an SOC of the low voltage battery; and
a power consumption detector configured to detect the consumption power of the electric load.

10. The apparatus of claim 8, wherein the predetermined travelling condition is satisfied when an engine is in an idle state, the mild hybrid electric vehicle is in a high-speed travelling state or a cruise travelling state, or the mild hybrid electric vehicle is in a coast travelling state.

11. The apparatus of claim 8, wherein when the MHSG does not assist in torque of the engine and the consumption power of the electric load is equal to or greater than a first power, the controller is configured to charge the low voltage battery so that the current SOC of the low voltage battery reaches the target SOC with a first charging speed.

12. The apparatus of claim 8, wherein when the MHSG assists in torque of the engine and the consumption power consumed by the electric load is equal to or greater than a first power, the controller is configured to stop assisting in torque of the engine, and to charge the low voltage battery so that the current SOC of the low voltage battery reaches the target SOC with a first charging speed.

13. The apparatus of claim 8, wherein when the MHSG assists in torque of the engine and the consumption power of the electric load is equal to or greater than a second power, the controller is configured to charge the low voltage battery so that the current SOC of the low voltage battery reaches an intermediate SOC with a first charging speed, and
the intermediate SOC is a value between the current SOC of the low voltage battery and the target SOC.

14. The apparatus of claim 13, wherein the controller is configured to charge the low voltage battery so that the current SOC of the low voltage battery reaches the target SOC from the intermediate SOC with a second charging speed, and
the second charging speed is less than the first charging speed.

\* \* \* \* \*